PARTY LINE TELEPHONE SYSTEMS

Filed Aug. 5, 1950 5 Sheets-Sheet 1

*INVENTOR.*
Len B. Mitchell

*BY*
Smith, Olsen & Baird
Attys.

PARTY LINE TELEPHONE SYSTEMS

Filed Aug. 5, 1950 5 Sheets-Sheet 2

INVENTOR.
Len B. Mitchell
BY
Smith, Olsen & Baird
Attys.

INVENTOR.
Len B. Mitchell
BY
Smith, Olsen + Baird
Attys.

INVENTOR.
Len B. Mitchell
BY
Smith, Olsen & Baird
Attys.

May 17, 1955 L. B. MITCHELL 2,708,690

PARTY LINE TELEPHONE SYSTEMS

Filed Aug. 5, 1950 5 Sheets-Sheet 5

INVENTOR.
Len B. Mitchell
BY
Smith, Olsen & Baird
Attys.

United States Patent Office 2,708,690
Patented May 17, 1955

2,708,690

PARTY LINE TELEPHONE SYSTEMS

Len B. Mitchell, Wheaton, Ill., assignor to Automatic Electric Laboratories, Inc., Chicago, Ill., a corporation of Delaware Application August 5, 1950, Serial No. 177,873
18 Claims. (Cl. 179—8.5)

Figure 1:
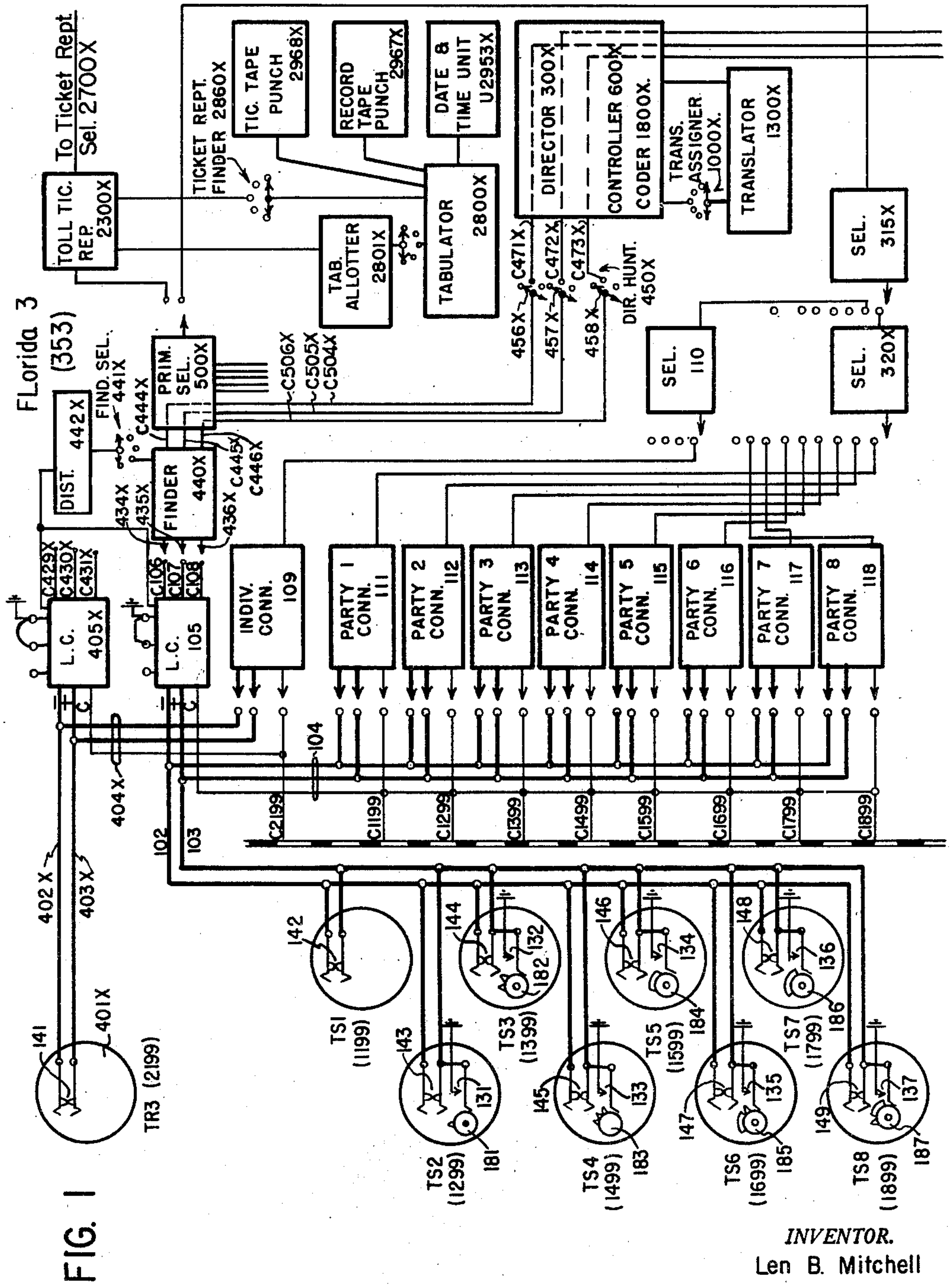

The present invention relates, in general, to telephone systems and more particularly to improved arrangements for identifying calling stations on party lines in automatic toll ticketing systems of the type disclosed in the John E. Ostline application, Serial No. 75,985, filed February 12, 1949, Now Patent No. 2,678,353, granted May 11, 1954.

In the automatic toll ticketing telephone system disclosed in the above mentioned Ostline application, an idle director is associated with a calling line as soon as a call is initiated thereon and the impulses corresponding to the digits of a called subscriber directory number, as dialed over the calling subscriber line are registered in the director. The first three dialed digits, indicative of the called office code, selectively control a common translator which translates the particular called office code digits into one or more routing digits and registers these routing digits in the director. After the translation is completed, the director automatically functions to transmit the routing digits and then certain of the registered digits of the called subscriber directory number in order to establish a connection, including a toll ticket repeater, with the desired called subscriber station.

As soon as the director determines that the particular call is to be ticketed, it selectively controls a detector to identify the digits of the directory number of the calling subscriber substation.

During the setting up of the connection to the called station and in response to the inclusion of the toll ticket repeater in the connection, the director transmits to the toll ticket repeater and registers therein, various items of information pertaining to the particular connection including the calling station directory number, the called station directory number, the class of service and the rate.

As soon as the connection is completed between the calling and called stations, the toll ticket repeater starts timing the call and, in response to the release of the connection, the toll ticket repeater will have registered therein all of the above mentioned items of information including the total elapsed time of the conversation of the particular call. Thereafter, the toll ticket repeater will transfer all of the registered information to a tabulator mechanism and the tabulator mechanism, in turn, will control a record tape punch mechanism and a ticket tape punch mechanism to produce two separate perforated tapes containing certain of the above noted items of information. These tapes may then be utilized to control appropriate business machines to produce printed records of the items of information.

The above system is also arranged to handle different classes of subscriber lines including private lines, paystation lines and four-party lines. Each of the substations connected to the various lines of the system is provided with a calling device to enable the subscriber thereat to transmit impulses corresponding to the digits of any called substation directory number. For this purpose, the calling device at the substations of the private type, the paystation type and the first substation on each party line is of conventional construction and arrangement, and the calling device at the second, third and fourth substations on each party line is of the construction and arrangement of the calling device disclosed in the John E. Ostline Patent No. 2,410,520, granted November 5, 1946.

The special dials at the second, third and fourth substations on the four-party lines are arranged to transmit regular loop impulses corresponding to the dialed digits and individual station identifying ground impulses. During the transmission of regular loop impulses, the special dial at the second, third or fourth station on a four-party line will also automatically transmit one, two or three spaced apart short ground impulses which are registered in the director to identify the respective second, third or fourth calling substation on the four-party line. Since the first station on the four-party line is provided with a conventional dial arranged to transmit only loop impulses, it does not transmit station identifying ground pulses to the director. In this manner, the director is selectively controlled during the dialing of the digits of a called subscriber directory number to register the identity of the particular calling station on any four-party line and, in accordance with this registration, it controls the detector to identify and register the numerical portion of the directory number of the particular calling station.

While the foregoing method of registering the identity of calling stations on a four-party line and of controlling the detector to identify the directory number of the particular calling party station, incident to the extension of a call, is entirely satisfactory, it inherently limits the number of stations that may be provided on any party line to four stations or less. In the above-mentioned system the number of stations that may be provided on any party line is limited to four because a subscriber, in order to control the associated dialing mechanism to transmit the maximum number of three station identifying ground impulses, must actuate his dialing mechanism in accordance with the digit 2 or any digit greater than 2. When the special dialing mechanism is actuated in accordance with the digit 2 and then released, it returns to its normal resting position. As soon as the mechanism starts its return movement, it transmits a first short ground impulse over the line conductors of the party line prior to the transmission of the first of two loop impulses. As the mechanism continues its return movement, it transmits, in succession, the first loop impulse, the second ground impulse, the second loop impulse and then the final ground impulse. If the dialing mechanism is actuated in accordance with any digit greater than 2, the additional loop impulses are transmitted prior to the transmission of the first short ground impulse and then each of the two remaining loop impulses and the two ground impulses are transmitted as noted above. In the above mentioned Ostline system, the station identifying ground impulses are only effective to be registered in the director during the dialing of the second letter or digit of the called office code of a called subscriber directory number. Therefore, in order to make sure that the maximum number of station identifying ground impulses will be transmitted during the dialing of the second digit, the second digit of all directory numbers, i. e. the second letter or digit of the called office code, must be the digit 2 or greater. The digit 1 cannot be used as the second digit of any called office code because all commercial dialing mechanisms are arranged with letter designations in the finger hole positions corresponding to the digits 2 to 9, inclusive.

One method of increasing the number of party stations on a party line in the above mentioned Ostline application, is to transmit an additional station identifying ground impulse for each added station. Each additional station, however, would then be provided with a dialing mechanism that would transmit the additional identifying ground impulse prior to the loop impulses corresponding respectively to the value of the dialed digit 3, 4, 5 etc. Accordingly, each time an additional ground impulse is required to identify an additional party station, the minimum value of the second letter or digit of the called office code is increased by one. In other words, if eight stations are to be provided on a party line, seven station identifying ground impulses would be transmitted during the return movement of the dial. Accordingly, the second letter or digit of any called office code in the system would then be limited to the digits 7, 8 and 9. Inasmuch as it is now the accepted practice in commercial telephone systems to employ the seven digit numbering scheme wherein the first two digits of a directory number correspond to the first two letters of the called exchange name, all of the digits 2 to 9, inclusive, and sometimes 0, must be available for dialing at least the first two letters of the called exchange name. The above limitations in the suggested method of identifying more than four stations on a party line render the system entirely unsatisfactory for commercial type toll ticketing telephone systems.

Accordingly, the principal object of the present invention is to provide in a telephone system of the type noted, an improved arrangement for identifying a particular calling station on a party line having more than four stations which arrangement requires no special operation and which permits the use of any of the letters corresponding to the digits 2 to 0, inclusive, in the called office codes.

A further object of the invention is to provide in a telephone system of the type noted an improved arrangement for registering the identity or position of any one of eight stations on a party line.

A further object of the invention is to provide in a telephone system of the type noted an improved calling device for transmitting more than three calling station identifying signals to the director when any digit greater than a predetermined digit is dialed by a calling station on the party line.

It is a still further object of the invention to provide in a telephone system of the type noted an improved circuit arrangement whereby code signals identifying calling stations on a party line are decoded and registered to determine the position of a calling station on a party line and to selectively control an identifier to identify the directory number of the particular calling station on the party line.

Further features of the invention pertain to the particular arrangement of the circuit elements of the system whereby the above-outlined and additional operating features are attained.

Figure 2:
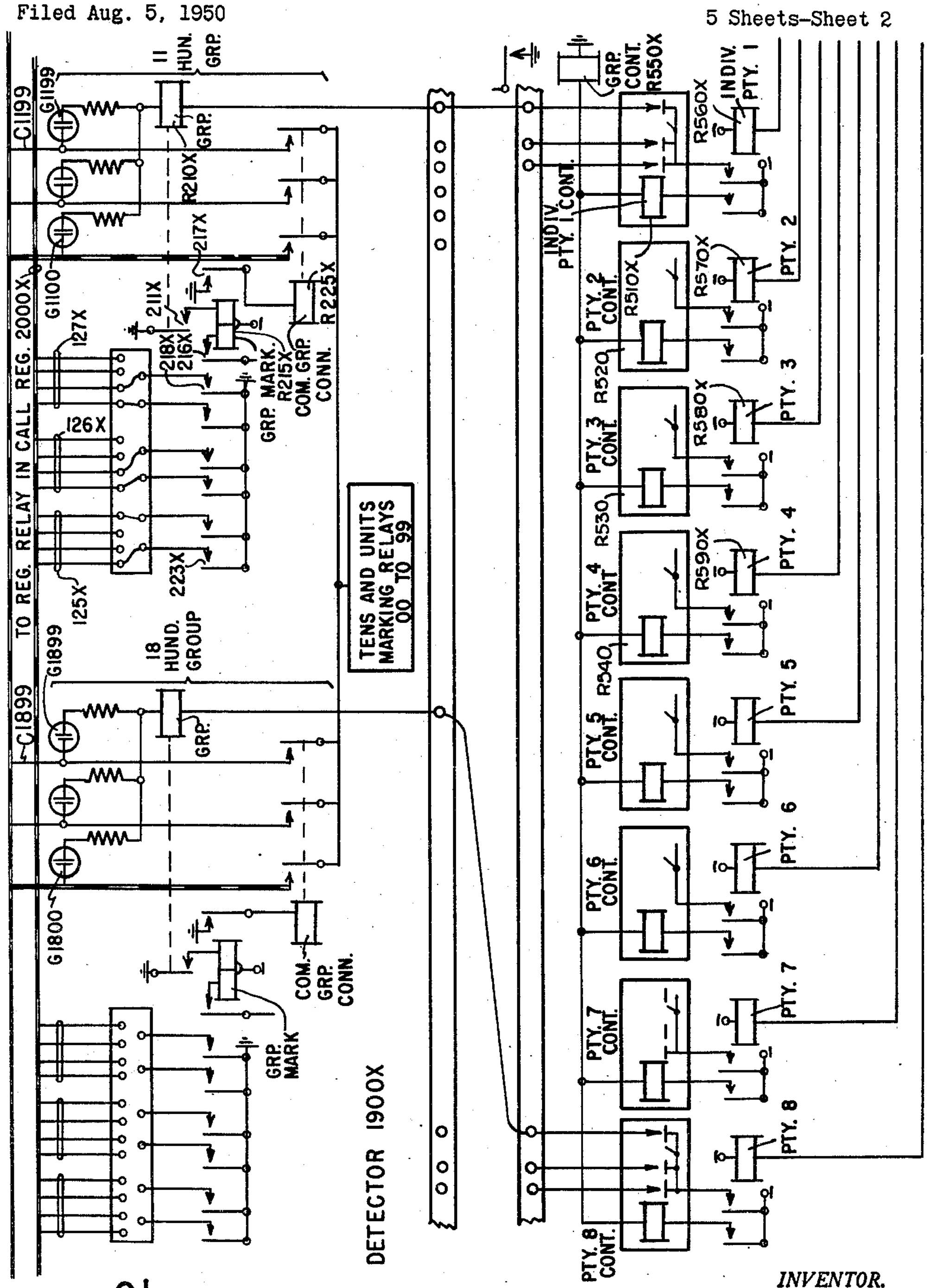
Figure 3:
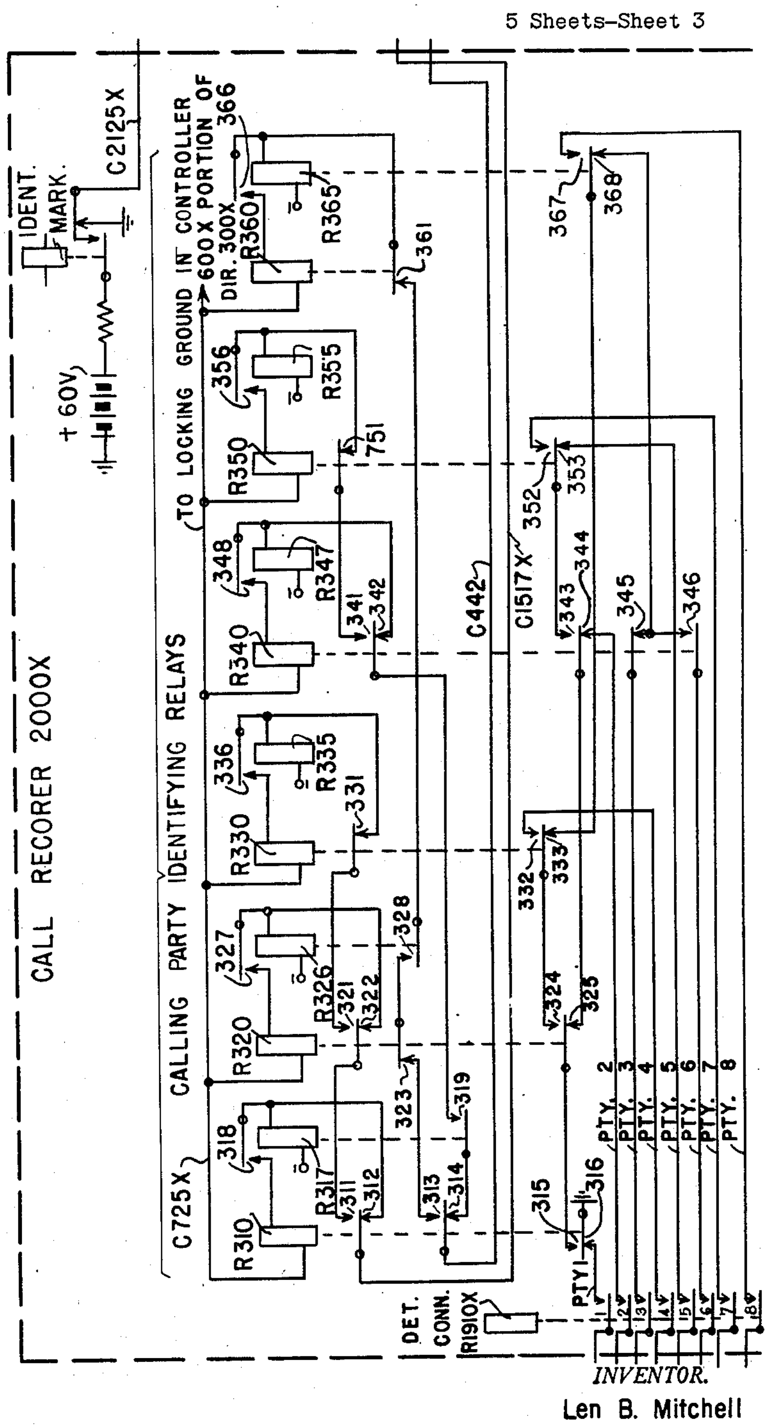
Figures 4, 5:
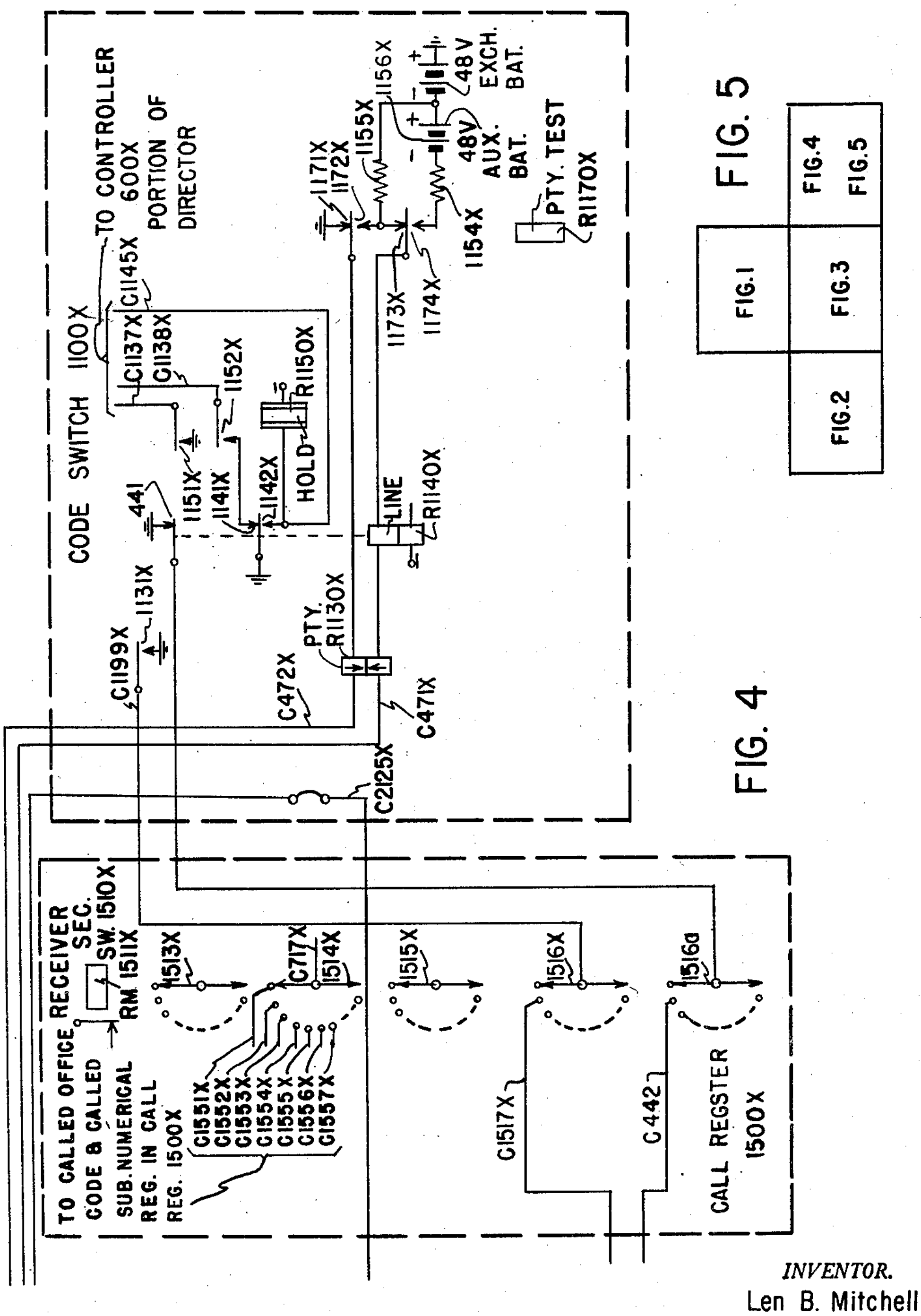
Figure 6:
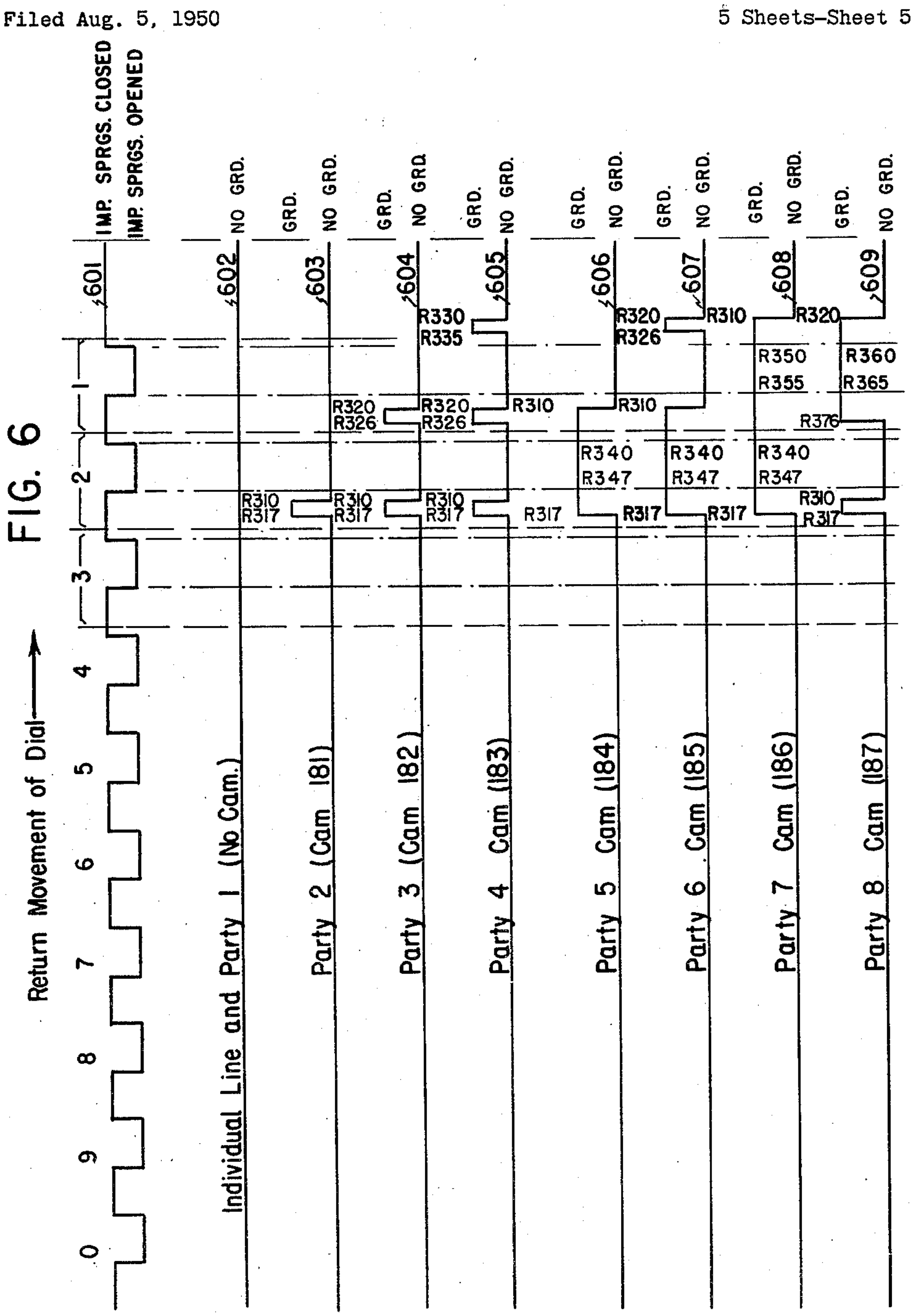

The invention, both as to its organization and method of operation, together with further objects and advantages thereof will best be understood by reference to the following specification and the accompanying drawings in which: Figs. 1 to 4, inclusive, illustrate the apparatus incorporated in a toll ticketing telephone system which apparatus has incorporated therein the features of the invention as briefly outlined above; Fig. 5 illustrates the mode of combining Figs. 1 to 4, inclusive, to perform a unified system; and Fig. 6 schematically illustrates the manner in which the special calling devices at the various subscriber substations on the party line transmit switch controlling impulses corresponding to digits of called subscriber numbers and station identifying ground impulses corresponding to the respective stations on the party line. More particularly, Fig. 1 illustrates schematically a major portion of the apparatus incorporated in the toll ticketing telephone system exchange; Fig. 2 illustrates a portion of the detector provided in the toll ticketing telephone exchange; Fig. 3 illustrates the details of the calling party identifying relays incorporated in the call recorder apparatus included in the director of the toll ticketing telephone exchange; and Fig. 4 discloses certain of the details of the call register apparatus and the code switch apparatus included in the director of the toll ticketing telephone exchange.

*The general arrangement of the telephone system*

In the disclosure of the previously mentioned copending Ostline application, the automatic toll ticketing telephone system serves a large metropolitan area and the adjacent suburban areas which are divided into a number of zones each of which includes one or more exchanges. In that system, the areas served comprise, among other zones, the zone 35 including the FLorida 1, FLorida 2 and FLorida 3 exchanges. Each exchange in each zone comprises a ten thousand terminal unit although the maximum capacity of each exchange need not be initially installed. The subscriber lines terminating at each exchange in each zone include both private subscriber lines and party subscriber lines. In order to provide separate substation telephone directory numbers for each of the substations on the party lines, they are terminated in the exchanges on a terminal-per-station basis.

The various exchanges in each zone are interconnected by suitable groups of trunk lines, not shown, and at least one exchange in each zone is connected with one or more of the exchanges in other zones by suitable groups of interconnecting toll lines. In the automatic toll ticketing telephone system the local and toll calls are established by automatic switching apparatus under control of the calling subscriber substation equipment including the usual calling device or dial. A universal numbering scheme is utilized whereby all called subscriber substations in the various exchanges in the various zones are dialed as listed in the telephone directory. Accordingly, the directory number of each subscriber substation comprises a code portion including three digits, representing respectively the first two letters of the exchange name and the digit representing the number of the particular exchange in the zone, and a numerical portion including four digits identifying the terminal of the particular called subscriber substation. Since all of the party lines are arranged on a terminal-per-station basis, each station thereon is provided with an individual four digit number identifying the particular terminal of the station on the party line.

The apparatus disclosed in Figs. 1 to 4, inclusive, represents the exchange apparatus provided in the FLorida 3 exchange as is shown in the previously mentioned copending Ostline application. This apparatus, however, has been modified in order to incorporate therein the previously noted features of the present invention and reference may be had to the above mentioned Ostline application for a more detailed explanation of the circuits which have been omitted to simplify the disclosure of the present application. In the previously mentioned Ostline application, however, the detector disclosed schematically therein corresponds to the detector illustrated in detail in Figs. 29 to 38, inclusive, of the Ostline application, Serial No. 453,799, filed August 6, 1942, now Patent No. 2,586,704, granted February 19, 1952. In the present application, the detector 1900X, schematically illustrated in Fig. 2 of the drawings, is in accordance with the detector illustrated and described in the copending Ostline application, Serial No. 79,677, filed March 4, 1949, now Patent No. 2,639,330, granted May 19, 1953, and reference may be had to the last mentioned application for a detailed explanation of the operation of the detector.

*The apparatus incorporated in the FLorida 3 exchange*

Before proceeding with the description of the switching equipment included in the FLorida 3 exchange, it should be noted that the apparatus illustrated in Figs. 1 to 4, inclusive, is provided with numerical designations identifying such apparatus and that some of these designations are also provided with the suffix "X." In order to facilitate cross referencing of the respective units of equipment with the corresponding equipment shown in the previously mentioned copending Ostline application, Serial No. 75,985, filed February 12, 1949, like units of equipment shown in Figs. 1, 3 and 4 in the present application have been given the same numerical designations as those appearing in the above mentioned Ostline application but including the suffix "X." Also in order to cross reference the equipment shown in Fig. 2 of the present application with the corresponding equipment shown in the previously mentioned copending Ostline application, Serial No. 79,677, filed March 4, 1949, like units of equipment in the present application have been given the same numerical designations as those appearing in the last mentioned Ostline application but including the suffix "X."

The switching equipment included in the FLorida 3 exchange comprises a number of line circuits individually associated with subscriber lines terminating in the exchange. For example, the line circuit 405X terminates the line conductors 402X and 403X of the regular subscriber substation TR3 and the line circuit 105 terminates the line conductors 102 and 103 commonly connected to the eight-party subscriber substations TS1 to TS8, inclusive.

The switching equipment in the Florida 3 exchange also comprises a group of finder switches, including the finder switch 440X, which have access to the line circuits 405X and 105 under control of the common distributor 442X and the associated finder switch selector 441X. The finder switch 440X is automatically selected for use in response to a call on any one of the subscriber lines to find and connect with the calling line and thus extend the same to the primary selector 500X individually associated with the finder switch. Each of the primary selectors in the exchange is provided with a director hunter, such as the director hunter 450X, having access to a group of directors including the director 300X.

Each director in the exchange includes a controller 600X portion, a coder 1800X portion, a code switch 1100X portion and a call register 1500X portion. In the present disclosure, the call register 1500X portion and the code switch 1100X portion of the director 300X have been partially disclosed in Fig. 4 of the drawings, in order to show the modifications thereof necessary for a complete understanding of the operation of these circuits in accordance with the present invention.

During the establishment of a connection, the called subscriber directory number is registered in the call register 1500X portion of the director and if it is determined that a translation is to be made of the code digits designating a particular called exchange, a translator 1300X, which is common to all of the directors in the exchange, will be connected to the particular calling director by means of the translator assigner 1000X. The translator 1300X is provided to translate the called office code digits into one or more routing digits which are registered in the director before the translator 1300X is released.

The telephone exchange is also provided with a local switch train including the selectors 110, 320X and 315X and a plurality of groups of connectors including the individual connector 109 and the party 1 to party 8, connectors 111 to 118, inclusive. The group of individual connectors, including the connector 109, have access over their associated bank contacts to the various individual subscriber substations including the regular subscriber substation TR3. The party connectors 111 to 118, inclusive, have access over their associated bank contacts to party lines including the party line connected to the eight subscriber substations TS1 to TS8, inclusive. Each of the party connectors 111 to 118, inclusive, is arranged to transmit a different ringing frequency over the two line conductors of the party line in order to selectively signal any one of the eight-party subscriber substations. All of the selectors and connectors, noted above, are of the Strowger type and are of conventional construction and arrangement.

The toll ticketing apparatus provided in the FLorida 3 exchange comprises a plurality of groups of toll ticket repeaters, one of which includes the toll ticket repeater 2300X, a number of tabulators, such as the tabulator 2800X, a ticket tape punch mechanism 2968X, a record punch tape mechanism 2967X and a date and time unit U2953X. In order to associate an idle one of the tabulators with a calling one of the toll ticket repeaters, there is also provided a tabulator allotter 2801X and a ticket repeater finder 2860X. It may be well to mention at this time that the toll ticket repeaters are individually connected to ticket repeater selectors in order to select toll trunks extending to other exchanges in the telephone system whenever a call, which is to be ticketed, is originated by a subscriber in the FLorida 3 exchange.

The telephone exchange is also provided with a call recorder, such as the call recorder 2000X, individually associated with each director in the exchange. The call recorder 2000X schematically shown in Fig. 3 includes the various modifications required to register the identification of any one of eight stations on an eight-party line and also the identification of any individual line station.

The detector 1900X schematically illustrated in Fig. 2 is the same as the detector 1900 shown in the previously mentioned Ostline application, Serial No. 79,677, filed March 4, 1949 except that it has been modified to show eight party relays, instead of four, for controlling the detector to detect the four-digit numerical portion of the directory number of any one of eight substations on any eight-party line. Depending upon the operated condition of one of the above mentioned relays, the detector operates in the manner described in the said Ostline application to identify the four digits of the numerical portion of the directory number of the calling subscriber substation. The four digits of the numerical portion of the number and also the digit 3 designating the calling FLorida 3 exchange are registered in the call recorder 2000X as soon as the detector has completed its identification operation. Thereafter, the detector 1900X is released for use in identifying the directory number of other calling subscriber substations.

Referring now to Fig. 1, it is noted that each subscriber substation is provided with a calling device or dial and it should be understood that each station is also provided with the usual substation apparatus (not shown) including a telephone instrument and a ringer. The calling device provided at the regular subscriber substation TR3 and at the first party subscriber substation TS1 on the party line is of conventional construction and arrangement wherein the impulsing springs, such as the springs 141 and 142, interrupt a circuit including the associated line conductors during the return movement of the dial to its normal position. The number of interruptions of the impulsing springs, during the return movement of the dial, is determined in accordance with the extent of the forward movement of the dial to the finger stop. The calling devices, provided at the second to eighth subscriber substations TS2 to TS8 inclusive, are of special construction and arrangement as previously noted. The special dials, in addition to the usual impulsing springs 143 to 149 inclusive, are provided with cams 181 to 187, inclusive, and associated contacts 131 to 137, inclusive, which are utilized to identify the position of the associated subscriber substations on the associated party line.

Referring now to Fig. 6, it will be seen that the impulsing springs at the various subscriber substations are arranged to interrupt the circuit including the line conductors 102 and 103, as is graphically illustrated by the line 601 and that the station identifying cams at the different substations on the party line are arranged to apply ground potential to the line conductors as is graphically illustrated by the lines 602 to 609, inclusive. Fig. 6 also shows the sequence in which the calling party identifying relays of Fig. 3 are operated in response to the different station identifying ground impulses. In accordance with conventional practice, the line 601 represents the action of the dial impulsing springs, during the return movement of the dial to normal, to transmit one or more switch controlling impulses over the conductors of the subscriber line in accordance with the digit dialed. The lines 603 to 609, inclusive, illustrate the manner in which each of the cams 181 to 187 at the party subscriber substations apply station identifying ground impulses to the line conductors during the return movement of the dial. More specifically, the line 602 illustrates the fact that the regular subscriber dials and the dials at the first party subscriber substation on the party lines do not transmit station identifying ground impulses. The line 603 represents the action of the cam 181 to control the associated contacts 131 during the return movement of the dial at the second party subscriber substation TS2. Accordingly, it will be seen that just prior to the transmission of the next to the last switch controlling impulse by the impulsing springs 143, a single short ground impulse is transmitted during the time the impulsing springs 143 are closed. The line 604 illustrates the action of the cam 183 and the associated contacts 132 during the return movement of the dial at the third party subscriber substation TS3 to transmit one short ground impulse just prior to the transmission of the next to the last switch controlling impulse and to transmit an additional short ground impulse between the transmission of the next to the last and the last switch controlling impulse by the impulsing springs 144. The line 605 illustrates the action of the cam 183 and the associated contacts 133 to transmit three short ground impulses over the line conductor 103 during the return movement of the dial at the fourth party subscriber substation TS4. At this substation, the first short ground impulse is transmitted just prior to the transmission of the next to the last switch controlling impulse, the second ground impulse is transmitted between the transmission of the next to the last and the last switch controlling impulses and the third ground impulse is transmitted after the transmission of the last switch controlling impulse by the impulsing springs 145. The line 606 illustrates the action of the cam 184 and the associated contacts 134 during the return movement of the dial at the fifth party subscriber substation TS5 to transmit one long ground impulse. It will be seen that the cam 184 closes the associated contacts 134 to apply ground potential to the line conductors just prior to the transmission of the next to the last switch controlling impulse by the impulsing springs 146 and that it retains the ground potential thereon until after the transmission of the next to the last switch controlling impulse. With this arrangement, a long ground impulse is retained on the line conductor 103 during the time that a switch controlling impulse is transmitted over the line conductor 102. The line 607 illustrates the action of the cam 185 and the associated contacts 135 during the return movement of the dial at the sixth party subscriber substation TS6 to transmit one long ground impulse followed by a short ground impulse. It will be seen that the cam 183 closes the associated contacts 135 to apply ground potential to the line conductors 102 and 103 just prior to the transmission of the next to the last switch controlling impulse by the impulsing springs 147 and that the ground potential is retained on the line conductor 103 until after the transmission of the next to the last switch controlling impulse. After the transmission of the last switch controlling impulse, the cam 184 closes the associated contacts 135 to transmit an additional short ground impulse over the line conductors. The line 608 illustrates the action of the cam 186 and the associated contacts 136 during the return movement of the dial at the seventh party subscriber substation TS7 to transmit an extra long ground impulse. It will be seen that the cam 186 closes the associated contacts 136 to apply ground potential to the line conductors just prior to the transmission of the next to the last switch controlling impulse by the impulsing springs 148 and that the ground potential is retained on the line conductor 103 until after the transmission of the last switch controlling impulse. Finally, the line 609 illustrates the action of the cam 187 and the associated contacts 137 during the return movement of the dial at the eighth party subscriber substation TS8 to transmit one short ground impulse followed by a long ground impulse. It will be seen that the cam 187 closes the associated contacts 137 to transmit a short ground impulse just prior to the transmission of the next to the last switch controlling impulse by the impulsing springs 149, that it applies ground potential to the line conductors 102 and 103 just prior to the transmission of the last switch controlling impulse and that it retains the ground potential on the line conductor 103 until after the transmission of the last switch controlling impulse.

*Identifying substation TS1*

In order to describe the operation of the telephone system to register the identity of any calling subscriber substation on the eight-party line, it will first be assumed that a metropolitan toll call is initiated by the first party subscriber substation TS1 whose connector bank terminal number is 1199. In response to the removal of the receiver from the associated switchhook at substation TS1, a loop circuit including the impulsing springs 142 and line conductors 102 and 103 is completed for operating the line circuit 105 individually associated with the eight-party line. The line circuit 105 operates in the well-known manner to cause the distributor 442X and the finder selector 441X to find and select an idle finder switch, such as the finder switch 440X. The selected finder switch operates in the well-known manner to find the terminals connected to the line circuit 105 individual to the calling subscriber line. Accordingly, it will be assumed that the finder switch 440X operates its wipers 434X to 436X, inclusive, in a vertical and then in a rotary direction to engage the terminals connected to the conductors C106 to C108, inclusive, individual to the line circuit 105. In response to the foregoing operation, the primary selector 500X causes the director hunter 450X to associate an idle director, such as the director 300X with the calling subscriber line.

As previously noted, the director 300X includes a controller 600X portion, a coder 1800X portion, a code switch 1100X portion and a call register 1500X portion. Since the controller 600X and the coder 1800X portions of the director do not require any modifications to illustrate the present invention, the details thereof have not been shown. However, the various modifications required in the call register 1500X and the code switch 1100X portions of the director have been illustrated in Fig. 4 to show the manner in which they cooperate to register the identity of any calling subscriber substation incident to the setting up of a connection.

Accordingly, when the director 300X is associated with the primary selector 500X by the director hunter 450X, a loop circuit including the calling subscriber party line is completed for operating the line relay R1140X in the code switch 1100X. This loop circuit may be traced from ground via contacts 1171X, upper winding of the party relay R1130X, conductor C472X, wiper 457X of the director hunter 450X, conductor C505X, primary selector 500X, conductor 445X, finder 440X, wiper 435X, conductor C107, line circuit 105, line conductor 103, calling subscriber substation TS1 including the impulsing springs 142, line conductor 102, line circuit 105, conductor C106, wiper 434X, finder 440X, conductor C444X, primary selector 500X, conductor C504X, wiper 456X of the director hunter 450X, conductor C471X, lower winding of the party relay R1130X, upper winding of the line relay R1140X, contacts 1173X, resistor 1155X and the negative terminal of the forty-eight volt exchange battery, to ground. The line relay R1140X operates over the above traced loop circuit but the party relay R1130X does not operate at this time due to the fact that the windings of the relay are differentially wound and oppose each other. As soon as the line relay R1140X operates, it completes, at its contacts 1142X, an obvious circuit for operating the hold relay R1150X and it applies ground potential to the conductor C1145X extending to the controller 600X portion of the director in order to initiate operation thereof to perform a class test of the calling subscriber line and to also control the transmission of a dial tone signal over the calling party line.

When the calling subscriber at substation TS1 hears the dial tone signal, the dial thereat may be actuated in accordance with the first two letters of the desired called exchange, the numerical digit designating the particular calling exchange and the four digits constituting the numerical portion of the called subscriber directory number. In accordance with conventional practice, the first two letters of any called exchange may correspond to any of the digits 2 to 9, inclusive. Accordingly, if the first letter of the called exchange is the letter A, B or C, the calling subscriber in response to actuation of the dialing mechanism will transmit two switch controlling impulses over the above described circuit to the line relay R1140X by momentarily interrupting the impulsing springs 142 two times. During the return movement of the dial, the switch controlling impulses will control the line relay R1140X to restore and reoperate two times in accordance with conventional practice. Each time the line relay R1140X restores, it completes, at its contacts 1141X, a circuit including the contacts 1152X and the conductor 1138X for registering in the call register 1500X portion of the director, the digit dialed by the calling subscriber.

Referring to the schematically illustrated call register 1500X, it will be seen that the receive sequence switch 1510X is normally positioned with its wipers in engagement with the first contacts of the associated contact banks. In this position, the wiper 1514X is in engagement with the conductor C1551X extending to the first called office code register. Accordingly, each of the impulses of the first digit are repeated by the line relay R1140X over the conductor C1138X to the controller and from the controller via the conductor C717X and the wiper 1514X to the conductor C1551X. The first called office code register is operated over this circuit to register the first called office code digit.

At the end of the first digit, the line relay R1140X remains in its operated position in order to retain the hold relay R1150X operated. Also at the end of the first digit, the controller 600X controls the rotary magnet RM1511X of the receive sequence switch 1510X to advance its wipers into engagement with the second set of contacts in the associated contact banks. The wiper 1514X now prepares a circuit including the conductor C1552X for controlling the second called office code register to register the second digit dialed by the calling subscriber.

In view of the foregoing, it should be understood that after each digit is dialed by the calling subscriber, the wipers of the receive sequence switch 1510X are advanced an additional step whereby the wiper 1514X successively engages the conductors C1551X to C1557X to successively connect the three called office code registers and the four numerical registers in the call register 1500X to receive and register the seven digits dialed by the calling subscriber. When the wipers 1516X and 1516a engage the second contacts in associated contact banks, circuits are prepared over the conductors C1517X and C442 for controlling the calling party identifying relays in Fig. 3 to register the identity of the position of any calling subscriber substation on an eight-party line.

At the end of the dialing of the first digit, the party test relay R1170X in the code switch 1100X is operated. At its contacts 1171X and 1173X, the relay R1170X disconnects the loop circuit, including the conductors C472X and C471X, from ground potential and the negative forty-eight volt exchange battery and, simultaneously therewith, at its contacts 1172X and 1174X, it connects the positive and negative terminals of the auxiliary forty-eight volt battery 1156X in series with the resistors 1155X and 1154X to the above described loop circuit. When the above transfer takes place, the line relay R1140X is retained in its operated position and the party relay R1130X is retained in its unoperated position due to the differential action of its upper and lower windings.

The calling subscriber at substation TS1 may now actuate his calling device in accordance with the digit corresponding to the second letter of the called subscriber directory number. As previously noted, this digit may also be any digit from 2 to 9, inclusive, and in response to the impulses corresponding to the dialed digit, the line relay R1140X repeats the impulses, at its contacts 1141X, to the second called office code register in the call register 1500X. At its contacts 441, the line relay R1140X also attempts to repeat impulses to the calling party identifying relays of Fig. 3 via the wiper 1516a and the conductor C442. However, due to the fact that the relays R310 and R317 are in their restored positions at this time, the calling party identifying relays are not operated under control of the line relay R1140X. It may be well to mention at this time that the windings of the party relay R1130X are energized and deenergized each time the circuit is interrupted by the impulsing springs 142 but inasmuch as the differential action of the relay prevents it from operating, its contacts 1131X are not closed.

At the end of the transmission of the second dialed digit, the receive sequence switch 1510X is controlled to advance its wipers into engagement with the third set of contacts in the associated contact banks, as previously noted, to prepare the impulsing circuit for the third called office code register. Also at the end of the second digit, the party test relay R1170X restores to normal thereby to recomplete the loop circuit via its contacts 1171X and 1173X to ground and the negative forty-eight volt exchange battery. The subsequent impulses of the digits dialed by the calling subscriber control the line relay R1140X, in the manner described above, to register the remaining digits in the call register 1500X portion of the director, in the manner previously described.

All of the digits of the called subscriber directory number are now registered in the call register 1500X. However, as soon as the three digits of the called office code, i. e. the digits corresponding to the first two letters of the called exchange name and the digit identifying the particular called exchange, are registered, the director 300X controls the translator assigner 1000X to connect the common translator 1300X to the director 300X. As a result of this connection, the translator is operated in accordance with the three digits of the called office code and it immediately registers in the coder 1800X portion of the director the routing digits which are to be utilized by the director in routing the particular call to the desired called exchange. The translator also controls the director to thereafter transmit certain ones of the digits of the called subscriber directory number as registered in the call register 1500X in order to complete the connection to the desired called subscriber substation. The translator 1300X also controls the director so that the call recorder 2000X individually associated therewith will be utilized to register the directory number of the calling subscriber substation. Thereafter, the translator 1300X is released from the calling director and made available for use by other directors in the exchange.

The director 300X now operates to transmit the routing digits registered therein by the translator, and then the selected ones of the digits registered in the call register 1500X over circuits incuding wipers (not shown) of the director hunter 450X to the primary selector 500X. In response to the first routing digit the primary selector 500X operates its wipers to select a group of trunks and to select an idle trunk in the selected group. Inasmuch as the call being extended is a toll call which is to be ticketed, it will be assumed that the idle trunk selected by the primary selector 500X includes the toll ticket repeater 2300X. Accordingly, the next routing digit transmitted by the director will control the ticket repeater selector 2700X (not shown), associated with the toll ticket repeater 2300X, to select an idle toll line extending in the direction of the desired called exchange. All of the remaining digits transmitted by the director, control the subsequent switches in the switch train over the selected toll line in accordance with conventional practice in order to complete the telephone connection to the desired called subscriber substation in the called exchange.

As previously noted the registration of the called office code digits in the call register 1500X portion of the director controls the translator 1300X to initiate the operation of the call recorder 2000X. During the time that the director is transmitting the various routing digits and the selected ones of the digits registered in the call register 1500X in order to establish the connection with the called subscriber substation, the call recorder 2000X is associated with the detector 1900X by way of the contacts 1 to 8, inclusive, of the detector connect relay R1910X. In the present call, the calling subscriber at substation TS1 is the first station on a party line and therefore the dial thereat is not provided with the previously mentioned station identifying cams. Therefore, when the dial at substation TS1 is actuated in accordance with the digits of the called subscriber directory number no ground impulses are transmitted over the line conductors to control the party relay R1130X. The party relay R1130X and the line relay R1140X cooperate in the manner to be described hereinafter to operate the calling party identifying relays in the call recorder 2000X in accordance with the position of each of the stations TS2 to TS8, inclusive, on the calling party line. Whenever a call is originated by an individual subscriber substation, such as the substation TR3, or the first station on a party line, such as the substation TS1, all of the calling party identifying relays remain in their restored positions.

Since all of the calling party identifying relays are in their restored positions when the detector connect relay R1910X is operated to associate the call recorder 2000X with the detector 1900X, the individual or party 1 relay R560X in the detector 1900X is operated over a circuit including the contacts 1 of the detector connect relay R1910X, the party 1 conductor and ground at contacts 316. The relay R560X registers the fact that the calling subscriber substation is either connected to an individual line or is the first substation connected to a calling party line. As a further result of the association of the call recorder 2000X with the detector 1900X, the identification marking relay shown in Fig. 3 is operated to substitute a positive sixty volt booster battery potential for the direct ground potential applied to the holding conductor C2125X. The booster battery potential is applied to the conductor C2125X for the purpose of controlling the detector 1900X to determine and register the four digits of the numerical portion of the directory number of the particular calling subscriber substation.

Before describing the circuit over which the booster battery potential is applied to the calling subscriber line, it may be advisable to briefly describe the detector 1900X. At the outset it should be noted that the detector has access to ten thousand terminals in the connector banks of the local switch train terminating the various subscriber lines. The detector includes one hundred group relays, such as the 1100 group relay R210X, one hundred group marking relays, such as the relay R215X, one hundred common group connect relays, such as the relay R225X, and one hundred common tens and units marking relays 00 to 99, inclusive. The one hundred common tens and units marking relays may be selectively connected to each of the separate hundred groups, such as the 1100 group, via the contacts of the common group connect relay, such as the relay R225X. Referring now to the 1100 group, which includes the relays R210X, R215X and R225X, it will be seen that the relay R210X is commonly connected through one hundred separate resistors and associated gas-filled discharge tubes G1100 to G1199, inclusive, to the one hundred identifying conductors C1100 to C1199, inclusive, in the 1100 group. The one hundred identifying conductors are individually connected to the one hundred connector bank terminals corresponding to the subscriber substations having the digits 1100 to 1199, inclusive, as the numerical portion of the directory number. The relay R210X is also connected by way of one of the multiple contacts of the individual and party 1 control relay R510X to one of the multiple contacts of the individual or party 1 relay R560X. The remaining hundred groups 1200, 1300 etc. in the detector including relays which are connected and arranged in substantially the same manner as the relays R210X, R215X and R225X in the 1100 group noted above, and which are connected to corresponding 1200, 1300 etc., groups of identifying conductors.

The detector 1900X is also provided with seven additional party relays control designated party 2 to party 8, inclusive, which are substantially identical to the individual and party 1 control relay R510X. The party 1 to party 8 relays are selectively operated, in the manner to be described hereinafter, by the calling party identifying relays of Fig. 3 to prepare circuits in the detector 1900X whereby the particular hundred group thereat will be selectively operated by the booster battery potential applied to a particular calling subscriber line to register the calling exchange numerical digit and the thousands, hundreds, tens and units digits corresponding to the numerical portion of the directory number of the particular calling subscriber substation.

In the call being described, the individual or party 1 relay R560X is operated when the call recorder 2000X is associated with the detector 1900X. At its left hand make contact, the relay R560X completes a series circuit for operating the relay R510X and the group control relay R550X. At its multiple contacts, the relay R510X completes a circuit for applying battery potential to the winding of the group relay R210X in the 1100 group. Other multiple contacts on the relay R510X will also complete circuits for applying battery potential to the windings of all other group relays, such as the relay R210X, in all of the other hundred groups which are connected to identifying conductors associated with terminals of individual lines and the terminals of the first stations on party lines.

Returning again to the identifying marking relay of Fig. 3, it will be seen that the ground potential normally applied to the conductor C2125X is connected via the director 300X, conductor C473X, wiper 453X, primary selector 500X, conductor C446X, finder 440X, wiper 436X, conductor C103, line circuit 105 and to the C conductor in the cable 104 to the C terminal in the connector banks of all connectors having access to the calling party line. This ground potential normally maintains the primary selector 500X, the finder 400X and the line circuit 105 in their operated positions, it busies these units of equipment to other apparatus having access thereto and it marks the calling eight-party line busy to all of the connectors having access thereto. Attention is directed to the fact that the holding and busy marking ground potential is also connected via the eight identifying marking conductors C1199, C1299 etc. to C1899, inclusive, to the corresponding hundred groups in the detector 1900X. The ground potential connected to the identifying marking conductors, however, does not effect operation of any of the groups relays, such as the relay R210X.

As soon as the identification marking relay operates and substitutes the positive sixty volt booster battery for the direct ground potential on the conductor C2125X, the various units of equipment are maintained in their operated positions, the busy condition is retained to prevent seizure thereof and the eight-party line is maintained busy to prevent seizure of the calling party line by the connectors having access thereto. The positive sixty volt booster battery is simultaneously applied to eight identifying conductors C1199 etc. corresponding respectively to the eight substations TS1 to TS9, inclusive, on the calling eight-party line. Although the booster battery potential is applied to all eight identifying conductors in eight separate hundred groups, only the identifying conductor C1199 is connected to a group relay that is in condition to be operated. More specifically, the positive booster battery connected to the marking conductor C1199 individual to the calling subscriber substation TX1 is connected via the associated gas-filled discharge tube G1199, the associated resistor, the winding of the group relay R210X in the 1100 group, a contact of the operated party 1 control relay R510X and a contact of the individual or party 1 relay R560X, to battery. The potential differences across the two electrodes of the gas-filled discharge device G1199 renders the tube conductive whereby the current flow over the above traced circuit causes the operation of the relay R210X. Upon operating, the relay R210X, at its contacts 211X, completes an obvious circuit for operating the group marking relay R215X which relay now locks itself in its operated position over a circuit including its contacts 216X. At its contacts 218X to 223X, inclusive, the relay R215X completes circuits for marking the conductors in the cables 125X to 127X, inclusive, in accordance with the digit 3 identifying the FLorida 3 exchange, the thousands digit 1 and the hundreds digit 1 of the numerical portion of the directory number of the calling subscriber at substation TS1. As a further result of the operation of the relay R215X, at its contacts 217X, it completes an obvious circuit for operating the common group connect relay R225X. The latter relay, upon operating, connects the one hundred identifying conductors C1100 to C1199, inclusive, to the one hundred common tens and units marking relays 00 to 99, inclusive. The positive sixty volt booster battery connected to the identifying conductor C1199 now operates the tens and units marking relay 99 connected thereto in order to register the tens digit 9 and the units digit 9 of the numerical portion of the directory number of the calling subscriber at substation TS1. Each of the five digits identified by the detector 1900X are registered in the call recorder 2000X in the manner described in the above mentioned Ostline application, Serial No. 79,677, filed March 4, 1949, and the detector 1900X is disconnected therefrom upon the restoration of the detector connect relay R1910X. Also, the identifying marking relay in the call recorder 2000X is restored to normal thereby to again apply the direct ground potential to the conductors C2125X.

As soon as the identification of the calling subscriber line has been completed, the director 300X may now transmit the exchange digit 3 identifying the calling FLorida 3 exchange followed by the digits 1199 identifying the first station TS1 on the calling party line and any other items of information, such as the called subscriber directory number, to the toll ticket repeater 2300X. After all of the items of information pertaining to the particular connection have been registered in the toll ticket repeater 2300X, the director will then transmit the last two digits of the called subscriber directory number in order to complete the connection to the desired called subscriber substation as previously described.

When the called subscriber answers, the toll ticket repeater operates to time the call and upon the subsequent release of the connection, the total elapsed conversational time will be registered therein. It should be noted that upon the release of the connection by the calling and called subscribers all of the switching apparatus except the toll ticket repeater 2300X and the associated repeater selector 2700X (not shown) are restored to normal. The toll ticket repeater 2300X, as well as the associated repeater selector 2700X, is retained in its operated position until all of the items of information registered therein have been transferred to an idle tabulator, such as the tabulator 2800X. After the various items of record information have been transferred, the toll ticket repeater 2300X and the repeater selector 2700X are restored to normal and rendered available for additional calls. Thereafter, the tabulator 2800X in conjunction with the date and time unit U2853X controls the record and tape punch mechanism 2967X and 2968X in order respectively to produce a perforated tape containing a common record of certain of the items of record information and a perforated tape containing an individual record of certain of the items of record information pertaining to the established connection.

*Identifying substation TS2*

If the above call is originated at the second substation TS2 on the eight-party line instead of at the first substation TS1, the operation of the equipment to complete the connection to the called subscriber substation is substantially the same as has been described. However, since the dial at substation TS2 includes the cam 181 and the associated contacts 131 for momentarily applying a short station identifying ground impulse to the line conductors 102 and 103 just prior to the transmission of the next to the last switch controlling impulse of each dialed digit, both the party relay R1130X and the line relay R1140X are selectively controlled to operate certain of the calling party identifying relays in the call recorder 2000X to register the fact that the calling substation is the second station on an eight-party line. Each of the remaining substations TS3 to TS8, inclusive, are also provided with cams and associated contacts, as previously noted, for controlling the operation of the calling party identifying relays to register the position of the respective substations on the eight-party line.

Referring to the calling party identifying relays shown in Fig. 3 it will be seen that the conductors C1517X and C442, over which the calling party identifying relays are selectively operated, are connected via the wipers 1516X and 1516*a* to the respective contacts 1131X and 441 only during the dialing of the second digit of the called substation directory number. Consequently, any operations of the relays R1130X and R1140X to control the respective contacts 1131X and 441 during the dialing of digits other than the second digit, i. e. any digit other than the digit corresponding to the second letter of a called office code, has no effect upon the calling party identifying relays. In view of the above, further description of the operation of the circuits will be limited to the operation thereof during the dialing of only the second digit. Consequently, the party test relay R1170X will be in its operated position and the wipers 1516X and 1516*a* will be in engagement with the contacts terminating the conductors C1517X and C442. With the circuits in this condition, the loop circuit for any calling station on the eight-party line includes the impulsing springs at the station and the line conductors 102 and 103 which are connected by the previously described units of equipment to the conductors C471X and C472X respectively in the code switch 1100X. The conductor C471X is connected via the lower winding of the relay R1130X, the upper winding of the line relay R1140X, the contacts 1174X and the resistor 1154X to the negative terminal of the auxiliary forty-eight volt battery 1156X. At this time, the conductor C472X is also connected via the upper winding of the relay R1130X, the contacts 1172X and the resistor 1155X to the positive terminal of the auxiliary forty-eight volt battery 1156X. In the above described loop circuit, the windings of the differential type relay R1130X are energized in opposite directions to prevent operation of the relay and the line relay R1140X is retained in its operated position.

With the relays R1130X and R1140X in the positions indicated, the calling subscriber at substation TS2 actuates his dial in accordance with the digit corresponding to the second letter of the called station directory number. This digit may be any digit from 2 to 9, inclusive, and, during the return movement, the dial will interrupt the impulsing springs 143 a number of times corresponding to the value of the digit. However, during the return movement of the dial, the cam 181 will also control its associated contacts 131 to transmit a single short ground impulse just prior to the transmission of the next to the last switch controlling impulse as is clearly illustrated by the lines 601 and 603 in Fig. 6. Accordingly, at the time the single ground impulse is transmitted, the impulsing springs 143 are closed so that the ground pulse is applied to the line conductors 102 and 103. As soon as the ground potential is applied to the line conductors, the current flow through the windings of the party relay R1130X is altered so that the relay will operate in series with the line relay R1140X. More specifically, the ground potential applied to the line conductor 103 is extended via the conductor C472X, the upper winding of the relay R1130X, the contacts 1172X, the resistor 1155X and the negative terminal of the forty-eight volt exchange battery, to ground. Simultaneously therewith, the ground potential applied to the conductor C102 is extended via the conductor C471X, the lower winding of the party relay R1130X, the upper winding of the line relay R1140X, the contacts 1174X, the resistor 1154X, the negative terminal of the auxiliary forty-eight volt battery 1156X and, in series therewith, the negative terminal of the forty-eight volt exchange battery, to ground. Accordingly, the current flow through the upper winding of the relay R1130 is reversed so that the upper winding is now energized in the same direction as the lower winding. It will also be appreciated that the current flow through the windings of the relays R1130X and R1140X is increased considerably by the inclusion of the two forty-eight volt batteries in series. As soon as the relay R1130X operates, it completes, at its contacts 1131X, a circuit including the conductor C1199X, the wiper 1516X, the conductor C1517X, and the contacts 312 for operating the relay R317. As soon as the ground potential is removed from the line conductors 102 and 103, the loop circuit for the relays R1130X and R1140X is restored to again change the current flow windings of the relay R1130X so that the relay immediately restores to normal. However, as previously noted, the line relay R1140X is retained in its operated position. As soon as the relay R1130X restores, at its contacts 1131X, it removes ground potential from the conductor C1517X.

Referring now to the relay R317, it will be seen that when the relay operates it prepares, at its contacts 318, a locking circuit for itself in series with the relay R310. However, this locking circuit does not become effective until the ground potential is removed from the conductor C1517X upon the restoration of the party relay R1130X. Consequently, when the ground potential is removed from the conductor C1517X, the locking circuit for the relay R317 is completed via the contacts 318, the winding of the relay R310 and the ground at conductor C725X. It should be noted at this time that the conductor C725X is grounded in the controller 600X portion of the director 300X until the director is released. The relay R310 operates in series with the relay R317 and it prepares, at its contacts 311, a point in the circuit for operating the relay R326 and, at its contacts 313, it prepares a point in the circuit for subsequently operating the relay R365.

Shortly after the transmission of the short ground impulse, the circuit for the relays R1130X and R1140X is interrupted two times by the impulsing springs 143. Each time the line relay R1140X momentarily restores to normal, at its contacts 441, it applies a ground potential to the conductor C442. However, the ground potential applied to the conductor C442 has no effect at this time inasmuch as the calling party identifying relay R326 has not been operated.

From the foregoing, it will be understood that the single short ground impulse transmitted by the cam 181 at substation TS2 will cause the operation of only the calling party identifying relays R317 and R310. The relay R310, at its contacts 315 will therefore complete a circuit via the contacts 325 and 334, the party 2 conductor, the contacts 2 of the detector connect relay R1910X and the winding of the party 2 relay R570X, to battery. The last mentioned circuit is only completed, however, after the detector 1900X has been associated with the call recorder 2000X by the operation of relay R1910X. The operated condition of the party 2 relay R570X controls the detector to identify the digits 1299 of the directory number of substation TS2 in the 1200 group.

*Identifying substation TS3*

If the above described call is originated at the third substation TS3 on the eight-party line, the cam 182 thereat actuates the associated contacts 132 to transmit two short ground impulses during the return movement of the dial as is clearly illustrated by the lines 604 and 601 in Fig. 6. The first short ground impulse is transmitted just prior to the transmission of the next to the last switch controlling impulse by the impulsing springs 144 in the same manner as previously described in connection with the operation of the cam 131 at substation TS2. Consequently, the party relay R1130X operates and restores to transmit a first short ground impulse over the conductor C1517X. The relay R317 operates in response to the first ground impulse on conductor C1517X and at the end of the impulse it locks itself in series with the relay R310. The dial at substation TS3 in returning to normal now controls the impulsing springs 144 to transmit the next to the last switch controlling impulse. In response thereto the line relay R1140X normally restores and transmits a short ground impulse over the conductor C442 but this impulse has no effect on the calling party identifying relays due to the fact that the contacts 314 and 328 are open at the present time. Immediately after the transmission of the next to the last switch controlling impulse, the second short ground impulse is transmitted by the cam 182 in order to momentarily reoperate the party relay R1130X. At its contacts 1131X, the relay R1130X transmits the second short ground impulse over the conductor C1517X and then via the contacts 311 and 322 and the winding of the relay R326, to battery. The relay R326 operates over this circuit and at the end of the impulse, i. e. as soon as the relay R1130X restores to normal, ground potential is removed from the conductor C1517X and the relay R326 locks itself via its contacts 327 in series with the relay R320 to the grounded conductor C725X. The dial at substation TS3 now controls the impulsing springs 144 to transmit the last switch controlling impulse in order momentarily to restore the line relay R1140X. At its contacts 441, the relay R1140X momentarily applies ground potential to the conductor C442 but since the contacts 223 are now opened by the operated relay R320, this ground impulse is without effect at this time.

In view of the foregoing, it will be seen that at the end of the dialing of the second digit by the subscriber at substation TS3 the calling party identifying relays R317, R310, R326 and R320 are operated in the order named to register the fact that the third substation TS3 on the eight-party line originated the call. With the above named relays in their operated positions, a circuit is completed via contacts 315, 324, 333, 368 and 345, the party 3 conductor and the contacts 3 of relay R1910X for operating the party 3 relay R580X as soon as the detector 1900X is associated with the call recorder 2000X by the operation of relay R1910X. The operated condition of the party 3 relay R580X controls the detector 1900X to identify the digits 1399 of the directory number of substation TS3 in the 1300 group.

*Identifying substation TS4*

If the above described call is originated at the fourth substation TS4 on the eight-party line, the cam 183 thereat will actuate the associated contacts 133 to transmit three short ground impulses during the return movement of the dial as is clearly illustrated by the lines 605 and 601 in Fig. 6. The first and second short ground impulses are transmitted respectively just prior to the transmission of the next to the last and the last switch controlling impulses by the impulsing springs 145 in the same manner as has been described above in connection with the operation of the cam 182 at substation TS3. Consequently, the party relay R1130X operates and restores two times to transmit the first and second ground impulses over the conductor C1517X to operate in the order named the calling party identifying relays R317, R310, R326 and R320. Shortly after the transmission of the last switch controlling impulse by the impulsing springs 145, a third short ground impulse is transmitted by the cam 183 thereby to momentarily restore the party relay R1130X a third time. At its contacts 1131X, the relay R1130X transmits the third short ground impulse via the conductor C1517X, the contacts 311, 321 and 331 in order to operate the relay R335. At the end of the third short ground impulse transmitted over the conductor C1517X, the relay R335 locks itself via its contacts 336 and the winding of the relay R330 to the grounded conductor C725X. The relay R330 operates in series with relay R335.

In view of the foregoing, it will be seen that at the end of the dialing of the second digit by the subscriber at substation TS4, the calling party identifying relays R317, R310, R326, R320, R335 and R330 are operated in the order named to register the fact that the fourth substation TS4 on the eight-party line originated the call. With the above named relays in their operated positions, a circuit is now completed via the contacts 315, 324 and 332, the party 4 conductor and the contacts 4 of the relay R1910X for operating the party 4 relay R590X as soon as the detector 1900X is associated with the call recorder 2000X by the operation of relay R1910X. The operation of the party 4 relay R590X controls the detector 1900X to identify the digits 1499 of the directory number of substation TS4 in the 1400 group.

*Identifying substation TS5*

If the above described call is originated at the fifth substation TS5 on the eight-party line, the cam 184 thereat will actuate the associated contacts 134 to transmit a long ground impulse, which overlaps the transmission of the next to the last switch controlling impulse by the impulsing springs 146, during the return movement of the dial, as is clearly illustrated by lines 606 and 601 in Fig. 6. During the return movement of the dial at substation TS5, the cam 184 controls the associated contacts 134 to apply ground potential to the line conductors 102 and 103 just prior to the transmission of the next to the last switch controlling impulse by the impulsing springs 146. The ground potential applied to the line conductors 102 and 103 operates the party relay R1130X in the manner previously described, in order to apply ground potential via its contacts 1131X, wiper 1516X, conductor C1517X, contacts 312 and the winding of relay R317, to battery. The relay R317 now operates in the manner previously described and prepares, at its contacts 319, a circuit for operating the relay R347. While the cam 184 retains the ground potential on the line conductors 102 and 103, the next to the last switch controlling impulse is transmitted by the impulsing springs 146. As soon as the impulsing springs 146 are opened, the ground potential at contacts 134 is removed from the line conductor 102 in order to interrupt the previously described circuit including the conductor C471X, the lower winding of the party relay R1130X and the upper winding of the line relay R1140X. However, at this time, the ground potential is retained on the conductor 103 in order to retain the party relay R1130X in its operated position over the energizing circuit including its upper winding. The line relay R1140X now restores to normal and, at its contacts 441, applies ground potential via the wiper 1516*a*, conductor C442, contacts 314, 319 and 342 and the winding of relay R347, to battery. The relay R347 now operates and at the end of the impulse, i. e., when the impulsing springs 146 are again closed, ground potential is reapplied to the line conductor 102 in order to reoperate the line relay R1140X and to again energize the lower winding of the party relay R1130X. As soon as the relay R1140X operates, it interrupts, at its contacts 441, the circuit for relay R347. The relay R347 now locks itself in its operated position via its contacts 348 and the winding of the relay R340 to the grounded conductor C725X. Shortly after the transmission of the next to the last impulse by the impulsing springs 146, the cam 184 controls the associated contacts 134 to remove ground potential from the line conductors 102 and 103 and thereby reestablishes the previously described loop circuit including the calling station impulse springs 146, the two windings of the party relay R1130X and the upper winding of the line relay R1140X. As soon as the loop circuit is reestablished, the windings of the party relay R1130X are energized in opposition to each other in order to restore the relay to normal. At its contacts 1131X, the relay R1130X removes ground potential from the conductor C1517X. As soon as the ground potential is removed from the conductor C1517X, the relay R317 locks itself in its operated position via its contacts 318, and the winding of the relay R310, to the grounded conductor C725X. The relay R310 operates in series with relay R317 when the above mentioned locking circuit is completed.

In view of the foregoing, it will be seen that at the end of the dialing of the second digit by the subscriber at substation TS5, the calling party identifying relays R317, R347, R340 and R310 are operated in the order named to register the fact that the fifth substation TS5 on the eight-party line originated the call. With the above relays in their operated positions, a circuit is completed via the contacts 315, 325, 343 and 353, the party 5 conductor and the contacts 5 of the relay R1910X for operating the party 5 relay in the detector 1900X as soon as the detector is associated with the call recorder 2000X by the operation of relay R1910X. The operation of the party 5 relay in the detector 1900X controls the detector to identify the digits 1599 of the directory number of substation TS5 in the 1500 group.

*Identifying substation TS6*

If the above described call is originated at the sixth substation TS6 on the eight-party line, the cam 185 thereat will actuate the associated contacts 135 to transmit a long ground impulse, which overlaps the transmission of the next to the last switch controlling impulse by the impulsing springs 147, and a short ground impulse, which is transmitted immediately following the transmission of the last switch controlling impulse by the impulsing springs 147, during the return movement of the dial as is clearly illustrated by the lines 607 and 601 in Fig. 6. During the return movement of the dial at substation TS6, the cam 185 controls the associated contacts 135 to apply ground potential to the line conductors 102 and 103 just prior to the transmission of the next to the last switch controlling impulse by the impulsing springs 147. The ground potential applied to the line conductors 102 and 103 operates the party relay R1130X and the calling party identifying relay R317 in the manner previously described. The cam 185 retains the ground potential on the line conductors 102 and 103 during the time that the next to the last switch controlling impulse is transmitted by the impulsing springs 147 to the line relay R1140X. As soon as the impulsing springs 147 are opened, the ground potential at contact 135 is removed from the line conductor 102 in order to interrupt the circuit for the line relay R1140X. The relay R1140X momentarily restores to normal and transmits a short ground impulse over the conductor C442 in order to operate the relay R347 and in order to operate the relay R340 in series with the relay R347 as soon as the short ground impulse is removed from the conductor C442 in the manner previously described. Shortly after the transmission of the next to the last switch controlling impulse by the impulsing springs 147, the cam 185 controls the associated contacts 135 to remove ground potential from the line conductors 102 and 103. At this instant, the previously described loop circuit including impulsing springs 147, the two windings of the party relay R1130X and the winding of the line relay R1140X is reestablished. Since the windings of the party relay R1130X are now energized in opposite directions the relay restores to normal. The line relay R1140X, however, is retained in its operated position. As soon as the party relay R1130X restores to normal, it removes ground potential, at its contacts 1131X, from the conductor C1517X thereby to cause the relay R317 to lock itself in its operated position in series with the relay R310 to the grounded conductor C725X. The relay R310, as previously noted, operates when the above mentioned locking circuit is completed. At this time, the dial controls the impulsing springs 147 to transmit the last switch controlling impulse to the line relay R1140X, in the manner previously described. The relay R1140X momentarily restores to normal and, at its contacts 441, applies ground potential to the conductor C442. This ground impulse has no effect at this time due to the fact that the contacts 314 and 328 are open. Immediately following the transmission of the last switch controlling impulse by the impulsing springs 147, the cam 185 controls the associated contacts 135 to transmit a short ground impulse over the line conductors 102 and 103. Accordingly, the party relay R1130X momentarily operates and restores to transmit, at its contacts 1131X, an additional short ground impulse over the conductor C1517X. The short ground impulse is transmitted via the contacts 311 and 322 in order to operate the relay R326 and when the ground potential is removed, at the end of the short ground impulse, the relay R326 locks itself via its contacts 327 and the winding of the relay R320 to the grounded conductor C725X. The relay R320 operates over the above mentioned locking circuit.

In view of the foregoing, it will be seen that at the end of the dialing of the second digit by the subscriber at substation TS6, the calling party identifying relays R317, R347, R340, R310, R326 and R320 are operated in the order named to register the facts that the sixth substation TS6 on the eight-party line originated the call. With the above relays in their operated positions, a circuit is completed via the contacts 315, 324, 333, 368 and 346, the party 6 conductor and the contacts 6 of the relay R1910X for operating the party 6 relay in the detector 1900X as soon as the detector is associated with the call recorder 2000X by the operation of relay R1910X. The operation of the party 6 relay in the detector 1900X controls the detector to identify the digits 1699 of the directory number of substation TS6 in the 1600 group.

*Identifying substation TS7*

If the above described call is originated by the seventh substation TS7 on the eight-party line, the cam 186 thereat will actuate the associated contacts 136 to transmit an extra long ground impulse which overlaps the transmission of the next to the last and the last switch controlling impulses by the impulsing springs 148, during the return movement of the dial as is clearly illustrated by lines 608 and 601 in Fig. 6. During the return movement of the dial at substation TS7, the cam 186 controls the associated contacts 136 to apply ground potential to the line conductors 102 and 103 just prior to the transmission of the next to the last switch controlling impulse by the impulsing springs 148 and to retain the ground potential on the line conductor 103 until shortly after the last switch controlling impulse has been transmitted by the impulsing springs 148. As previously noted, the party relay R1130X operates as soon as the ground potential is applied to the line conductors 102 nd 103 thereby to complete the previously described circuit for operating the relay R317. Shortly thereafter, the impulsing springs 148 are operated to momentarily remove ground potential from the line conductor 102 two times in order to transmit the next to the last and the last switch controlling impulses to the line relay R1140X. The ground potential retained on the conductor 103 by the contacts 136 retains the party relay R1130X in its operated position during the time the line relay R1140X is momentarily restored two times in accordance with the next to the last and the last switch controlling impulses transmitted by the impulsing springs 148. The first time the line relay R1140X restores to normal after the operation of the relay R317, the ground potential at its contacts 441, completes a circuit via the conductor C442, contacts 314, 319 and 343 for operating the relay R347. As soon as the line relay R1140X reoperates at the end of the impulse, the ground potential is removed at contacts 441 and the relay R347 locks itself via its contatcs 348 and the winding of the relay R340 to the grounded conductor C725X. The relay R340 operates in series with the relay R347 and, at its contacts 341, prepares a point in the circuit for operating the relay R355. As soon as the line relay restores in response to the last impulse transmitted by the impulsing contacts 148, the ground potential is again applied to the conductor C442 thereby to operate the relay R355 over the previously described circuit. When the line relay R1140X reoperates at the end of the last impulse, it removes ground potential from the conductor C442 and causes the relay R355 to complete a locking circuit for itself via the contacts 356 and the winding of the relay R350 to the grounded conductor C725X. Immediately following the transmission of the last impulse by the impulsing springs 148, the cam 186 controls the associated contacts 136 to remove ground potential from the line conductors 102 and 103 and thereby reestablishes the previously described loop circuit including the impulsing springs 148, the two windings of the party relay R1130X and the upper winding of the line relay R1140X. At this time, the party relay R1130X restores to normal, due to the direction of the current flow in its differential windings, and the line relay R1140X is retained in its operated position. At its contacts 1131X, the relay R1130X now removes ground potential from the conductor C1517X thereby to permit the relay R317 to lock itself in its operated position in series with the relay R310 to the grounded conductor C725X. The relay R130 operates in series with the relay R317.

In view of the foregoing, it will be seen that at the end of the dialing of the second digit by the subscriber at substation TS7, the calling party identifying relays R317, R347, R340, R355, R350 and R310 are operated in the order named to register the fact that the seventh substation TS7 on the eight-party line originated the call. With the above mentioned relays in their operated positions a circuit is completed via the contacts 315, 325, 343 and 352, the party 7 conductor and the contacts 7 of the relay R1910X for operating the party 7 relay in the detector 1900X as soon as the detector 1900X is associated with the call recorder 2000X by the operation of the relay R1910X. The operation of the party 7 relay in the detector 1900X controls the detector to identify the digit 1799 of the directory of the substation TS7 in the 1700 group.

*Identifying substation TS8*

If the above described call is originated at the eighth substation TS8 on the eight-party line, the cam 187 thereat will actuate the associated contacts 137 to transmit a short ground impulse just prior to the transmission of the next to the last switch controlling impulse by the impulsing springs 149 and to transmit a long ground impulse which overlaps the transmission of the last switch controlling impulse by the impulsing springs 149, during the return movement of the dial, as is clearly illustrated by lines 609 and 601 in Fig. 6. During the return movement of the dial at substation TS8, the cam 187 controls the associated contacts 137 to transmit a short ground impulse over the line conductors 102 and 103 just prior to the transmission of the next to the last switch controlling impulse by the impulsing springs 149. The party relay R1130X momentarily operates, in the manner previously described, to transmit, at its contacts 1131X, a short ground impulse over the conductor C1517X. The relay R317 operates in response to the short ground impulse over the conductor C1517X and, at the end of the impulse, locks itself in series with the relay R310 in the manner previously described. The relay R310 now operates and, at its contacts 311 and 313 prepares points in the circuit for operating the relays R326 and R365. The dial at substation TS8 now controls the impulsing springs 149 to transmit the next to the last switch controlling impulse thereby to interrupt the circuit including the line conductors 102 and 103 and the line relay R1140X, in the manner previously described, to transmit a short ground impulse over the conductor C442. However, this short ground impulse is without effect at the present time due to the fact that the relay R326 is in its restored position. Shortly after the transmission of the next to the last switch controlling impulse by the impulsing springs 149, the cam 187 controls the associated contacts 134 to again apply ground potential to the conductors 102 and 103. The relay R1130X reoperates, in the manner previously described, and, at its contacts 1131X, applies ground potential to the conductor C1517X. The ground potential applied to the conductor C1517X is connected via the contacts 311 and 322 in order to operate the relay R326. During the time the cam 187 controls the associated contacts 137 to retain the ground potential on the line conductors 102 and 103, the dial controls the impulsing springs 149 to transmit the last switch controlling impulse by momentarily removing the ground potential from the line conductor 102. Accordingly, the line relay R1140X momentarily restores to normal in response to the last switch controlling impulse transmitted by the impulsing springs 149 and the party relay R1130X is retained in its operated position by the ground potential applied to the conductor 103. At its contacts 441, the line relay R1140X momentarily applies ground potential via the conductor C442, the contacts 313, 323, 328 and 361 for operating the relay R365. As soon as the relay R1140X operates at the end of the last impulse transmitted by the impulsing springs 149, it removes ground potential from the conductor C442 in order to permit the relay R365 to lock itself in its operated position over a circuit including its contacts 366, the winding of the relay R360 and the grounded conductor C725X. The relay R360 operates in series with the relay R365. Shortly after the transmission of the last impulse by the impulsing springs 149, the cam 187 again controls the associated contacts 137 to remove ground potential from the line conductors 102 and 103 and thereby reestablish the previously described loop circuit including the impulsing springs 149, the two windings of the relay R1130X and the upper winding of the relay R1140X. The relay R1130X now restores to normal due to its differential action and the line relay R1140X is retained in its operated position. At its contacts 1131X, the relay R1130X now removes ground potential from the conductor C1517X in order to permit the relay R326 to lock itself in its operated position in series with the relay R320, which also operates, to the grounded conductor C725X.

In view of the foregoing, it will be seen that at the end of the dialing of the second digit by the subscriber at substation TS8, the calling party identifying relays R317, R310, R326, R365, R360 and R320 are operated in the order named to register the fact that the eighth substation TS8 on the eight-party line originated the call. With the above relays in their operated positions, a circuit is completed via the contacts 315, 324, 333 and 367, the party 8 conductor and the contacts 8 of the relay R1910X for operating the party 8 relay in the detector 1900X as soon as the detector is associated with the call recorder 2000X by the operation of the relay R1910X. The operation of the party 8 relay in the detector 1900X controls the detector to identify the digits 1899 of the directory number of the substation TS8 in the 1800 group.

*Conclusion*

In view of the above explanation of the mode of operation of the calling party identifying relays to identify the position of any calling substation on an eight-party line, in response to a single operation of the dial thereat, it will be readily appreciated that the detector 1900X is controlled to identify the numerical portion of the directory number of any one of the calling stations on the eight-party line in the manner briefly described above in connection with the establishment of a telephone connection by the subscriber at the first substation TS1. It will also be appreciated that by arranging the dials at the different substations to transmit different combinations of short and long ground impulses, as well as switch controlling impulses during a single operation thereof, at least eight different substations on a calling party line may be selectively identified without restoring to any special operation or controls at the calling substation.

While one embodiment of the invention has been disclosed, it will be understood that various modifications may be made therein which are within the true spirit and scope of the invention.

What is claimed is:

1. In a telephone system, a party line, a plurality of stations on said party line, a calling device at each of said stations, each calling device being selectively operable to transmit over said line during a single operation thereof both a variable number of switch controlling impulses and a fixed code of station identifying impulses, said codes of identifying impulses being different as to number and as to time duration, a first line relay controlled by said switch controlling impulses transmitted over said line, a second line relay controlled by said identifying impulses transmitted over said line, a first control circuit governed by said first line relay, a second control circuit governed by said second line relay, and means connected to said control circuits selectively controlled by the number and duration of said identifying impulses transmitted to said second line relay and by the number of said switch controlling impulses transmitted to said first line relay after said second line relay is controlled for registering the position of any calling station on said party line in accordance with its fixed code.

2. In a telephone system, a party line, a plurality of stations on said party line, a calling device at each of said stations, each calling device being selectively operable to transmit over said line during a single operation thereof both a variable number of first switch controlling impulses and a fixed code of station identifying impulses, said codes of identifying impulses being different as to number and as to time duration, a first line relay controlled by said switch controlling impulses transmitted over said line, a second line relay controlled by said identifying impulses transmitted over said line, a first control circuit governed by said first line relay, a second control circuit governed by said second line relay, and a group of register relays selectively controllable over said second control circuit by the number and time duration of said identifying impulses transmitted to said second line relay and selectively controllable over said first control circuit by at least one of said switch controlling impulses transmitted to said first line relay depending upon the number and time duration of said identifying impulses for registering the identity of any calling station on said party line in accordance with its fixed code.

3. In an automatic telephone system, a party line, a plurality of stations on said party line, a calling device at each of said stations, the calling device at any calling one of said stations being selectively operable to transmit over said party line during a single operation thereof both a number of switch controlling impulses corresponding to a selected digit in a telephone number and an individual calling station identifying signal, whereby the calling devices at said stations transmit over said party line different station identifying signals incident to operation thereof, said different station identifying signals comprising different combinations of short and long ground impulses, said long ground impulses being of longer duration than any one of said switch controlling impulses, switching apparatus, a line relay controlled in response to the transmission of said switch controlling impulses for controlling said switching apparatus to extend a call from a calling one of said stations, a party relay controlled in response to the transmission of said calling station identifying signal, and register means operated by said party relay in accordance with the particular combination of said short and long ground impulses included in said calling station identifying signal for registering the identity of said calling station.

4. In an automatic telephone system, a party line, a plurality of stations on said party line, a calling device at each of said stations, each of said calling devices being selectively operable to transmit over said party line during a single operation thereof both a variable number of switch controlling impulses and a single ground impulse, said single ground impulse transmitted by the calling devices at the different stations being different as to time duration, switching apparatus, a line relay controlled in response to the transmission over said party line of said switch controlling impulses for operating said switching apparatus to extend a call from said party line, a party relay controlled in response to the transmission over said party line of said single ground impulse for identifying the calling one of said stations on said party line in accordance with the time duration of the single ground impulse transmitted by the calling device thereat.

5. In an automatic telephone system, a party line, a plurality of stations on said party line, a calling device at each of said stations, the calling device at any calling one of said stations being selectively operable to transmit over said party line during a single operation thereof both a variable number of first type impulses and a fixed number of second type impulses, said second type impulses transmitted by the calling device at a first station on said party line being of short duration and transmitted prior to the transmission of a predetermined one of said first type impulses, said second type impulses transmitted by the calling device at a second station on said party line being of long duration and transmitted to overlap the transmission of a predetermined one of first type impulses, said second type impulses transmitted by the calling device at a third station on said party line being of extra long duration and transmitted to overlap the transmission of a predetermined two of said first type impulses, and register means selectively operated by said first and said second type impulses for identifying said first, second or third station.

6. In an automatic telephone system, a party line, a plurality of stations on said party line, a calling device at each of said stations, the calling device at any calling one of said stations being selectively operable to transmit over said party line during a single operation thereof both a variable number of first type impulses and a single ground impulse, said single ground impulse transmitted by the calling device at a first of said stations on said party line being of short duration and transmitted prior to a predetermined one of said first type impulses, said single ground impulse transmitted by the calling device at a second of said stations on said party line being of long duration and transmitted to overlap a predetermined one of said first type impulses, said single ground impulse transmitted by the calling device at a third of said stations on said party line being of extra long duration and transmitted to overlap a predetermined two of said first type impulses, and register means selectively operated by said first type impulses and said single ground impulse for identifying said first station in response to said transmission of said single ground impulse prior to the transmission of one of said first type impulses and for identifying said second station in response to said transmission of said single ground impulse to overlap one of said first type impulses and for identifying said third station in response to said transmission of said single ground impulse to overlap two of said first type impulses.

7. In an automatic telephone system, a party line, a plurality of stations on said party line, a calling device at each of said stations, the calling device at any calling one of said stations being selectively operable to transmit over said party line during a single operation thereof both a variable number of first type impulses and a fixed number of second type impulses, said second type impulses transmitted by the calling device at one of said stations on said party line being of short duration and transmitted between successive first type impulses, said second type impulses transmitted by the calling device at another of said stations on said party line being of a long duration and transmitted to overlap at least one of said first type impulses, and means selectively controlled by said first and said second type impulses for identifying said one station in response to said transmission of said second type impulses between successive first type impulses or for identifying said other station in response to said transmission of said second type impulses to overlap at least one of said first type impulses.

8. In an automatic telephone system, a party line, a plurality of stations on said party line, a calling device at each of said stations, each of said calling devices being selectively operable to transmit over said party line during a single operation thereof both a variable number of switch controlling impulses and a single ground impulse, said single ground impulse transmitted by the calling devices at the different stations being different as to time duration, switching apparatus, a line relay controlled in response to the transmission over said party line of said switch controlling impulses for operating said switching apparatus to extend a call from said party line, a party relay controlled in response to the transmission over said party line of said single ground impulse, and means jointly controlled by said party relay and said line relay for identifying the calling one of said stations on said party line in accordance with at least one of the switch controlling impulses and the time duration of the single ground impulse transmitted by the calling device thereat.

9. In an automatic telephone system, a party line, a plurality of stations on said party line, a calling device at each of said stations, the calling device at any calling one of said stations being selectively operable to transmit over said party line during a single operation thereof both a variable number of first type impulses and a fixed number of second type impulses, said second type impulses transmitted by the calling device at a first station on said party line being of short and long durations and transmitted in the order named so that the long impulse overlaps the transmission of at least one of said first type impulses, said second type impulses transmitted by the calling device at a second station on said party line being of long and short duration and transmitted in the order named so that said long impulse overlaps the transmission of at least one of said first type impulses, and means selectively controlled by said first and said second type impulses for identifying said first or said second station.

10. In an automatic telephone system, a party line, a plurality of stations on said line, a calling device at a calling one of said stations, said calling device being selectively operable to transmit over said line during a single operation thereof both a variable number of switch controlling impulses and a single ground impulse, said single ground impulse transmitted by said calling device being transmitted over said line so that it overlaps the transmission of the next to the last switch controlling impulse, switching apparatus, a line relay controlled by the transmission over said line of said switch controlling impulses for controlling said switching apparatus to extend a call from said calling station, calling station register relays, a party relay operated by the transmission over said line of said single ground impulse for selectively operating at least one of said register relays, means controlled by said line relay effective only by said next to the last switch controlling impulse transmitted thereto at the time said party relay is operated by said overlapping ground impulse for selectively operating one or more other of said register relays, and means operated by said selective operation of said register relays for identifying said calling station.

11. In an automatic telephone system, a party line, a plurality of stations on said line, a calling device at a calling one of said stations, said calling device being selectively operable to transmit over said line during a single operation thereof both a variable number of switch controlling impulses and a single ground impulse, said single ground impulse being transmitted over said line so that it overlaps the transmission of the last two switch controlling impulses, switching apparatus, a line relay controlled by the transmission over said line of said switch controlling impulses for controlling switching apparatus to extend a call from said calling station, calling station register relays, a party relay operated in response to the transmission over said line of said single ground impulse for selectively operating at least one of said register relays, means controlled by said line relay effective only by said last two switch controlling impulses transmitted thereto at the time said party relay is operated by said overlapping ground impulse for selectively operating at least two other of said register relays, and means operated by said selective operation of said register relays for identifying said calling station.

12. In an automatic telephone system, a party line, a plurality of stations on said line, a calling device at a calling one of said stations, said calling device being selectively operable to transmit over said line during a single operation thereof both a variable number of switch controlling impulses and two ground impulses, said two ground impulses transmitted by said calling device being respectively of short and long duration and transmitted over said line in the order named so that the short ground impulse is transmitted prior to the transmission of the next to the last switch controlling impulse and so that said long ground impulse is transmitted to overlap the transmission of the last switch controlling impulse, switching apparatus, a line relay controlled by the transmission over said line of said switch controlling impulses for controlling said switching apparatus to extend a call from said calling station, calling station register relays, a party relay operated by the transmission over said line of said two ground impulses for selectively operating at least two of said register relays, means controlled by said line relay effective only by said last switch controlling impulse transmitted thereto at the time said party relay is operated by said overlapping ground impulse for selectively operating one or more other of said register relays, and means operated by said selective operation of said register relays for identifying said calling station.

13. In an automatic telephone system, a party line, a plurality of stations on said line, a calling device at a calling one of said stations, said calling device being selectively operable to transmit over said line during a single operation thereof both a variable number of switch controlling impulses and two ground impulses, said two ground impulses transmitted by said calling device being respectively of long and short duration and transmitted over said line in the order named so that the long ground impulse is transmitted to overlap the transmission of the next to the last switch controlling impulse and so that said short ground impulse is transmitted after the transmission of the last switch controlling impulse, switching apparatus, a line relay controlled by the transmission over said line of said switch controlling impulses for controlling said switching apparatus to extend a call from said calling station, calling station register relays, a party relay operated by the transmission over said line of said two ground impulses for selectively operating at least two of said register relays, means controlled by said line relay effective only by said next to the last switch controlling impulse transmitted thereto at the time said party relay is operated by said overlapping ground impulse for selectively operating one or more other of said register relays, and means operated by said selective operation of said register relays for identifying said calling station.

14. In a telephone system, a party line having two conductors, a plurality of stations on said party line, a calling device at each of said stations, each calling device being selectively operable to transmit over said party line during a single operation thereof both a variable series of switch controlling impulses and an individual station identifying signal, whereby the calling devices at said stations transmit over said party line different individual station identifying signals incident to operation thereof comprising ground impulses that are different as to number and as to time duration, a line relay provided with a winding, a party relay provided with at least two windings, means controllable at any calling one of said stations for completing a first series circuit that includes the calling device at the calling one of said stations and the two conductors of said party line and said line relay winding and said party relay windings, said party relay windings connected in said first circuit so that energization thereof does not operate said party relay, said line relay winding connected in said first circuit so that energization thereof operates said line relay, said line relay thereafter controlled over said first circuit by the transmission of certain of said switch controlling impulses and said party relay thereafter controlled by the transmission of said ground impulses, each of said ground impulses altering said first circuit so that a second circuit is completed that includes said calling station calling device and one of said line conductors and one winding of said party relay and a third circuit is completed that includes said calling station calling device and another winding of said party relay and the winding of said line relay, said party relay windings connected in said second and said third circuits so that the energization thereof operates said party relay, said line relay winding connected in said third circuit so that energization thereof retains said line relay in its operated position, said line relay thereafter controlled over said third circuit by further switch controlling impulses and said party relay thereafter controlled over said second circuit by the number and time duration of said ground impulses, means controlled by said line relay for registering each of said switch controlling impulses transmitted over said first circuit and said third circuit from said calling station calling device in order to extend a connection from said party line, and means jointly controlled by said party relay in response to the number and time duration of said ground impulses transmitted over said second circuit and by said line relay in response to the number of switch controlling impulses transmitted over said third circuit for registering the identity of the particular calling station on said party line.

15. In an automatic telephone system, a party line, a plurality of stations on said party line, a calling device at each of said stations, the calling device at any calling one of said stations being selectively operable to transmit over said party line during a single operation thereof both a variable series of impulses and an individual station identifying signal, whereby the calling devices at said stations transmit over said party line different station identifying signals incident to operation thereof, switching apparatus, a line relay controlled in response to the transmission over said party line of one or more variable series of impulses for controlling said switching apparatus to extend the call from the calling one of said stations, a party relay controlled in response to the transmission over said calling party line of said calling station identifying signal, a plurality of station identifying registers, a first conductor and a second conductor, and means including contacts operated respectively by said line relay and said party relay for selectively operating said station identifying registers over circuits respectively including said first and said second conductors to identify said one calling station on said calling line.

16. In an automatic telephone system, a party line, a plurality of stations on said party line, a calling device at each of said stations, the calling device at any calling one of said stations being selectively operable to transmit over said party line during a single operation thereof both a variable series of impulses and an individual station identifying signal, whereby the calling devices at said stations transmit over said party line different station identifying signals incident to operation thereof, switching apparatus, a line relay controlled in response to the transmission over said party line of one or more variable series of impulses for controlling said switching apparatus to extend the call from the calling one of said stations, a party relay controlled in response to the transmission over said party line of the station identifying signal individual to the calling device at said one calling station, a first register, a first control conductor for said first register, a second register, a second control conductor for said second register, contact means operated by said party relay for selectively operating said first register over a circuit including said first control conductor, and contact means operated by said line relay for selectively operating said second register over a circuit including said second control conductor and contacts controlled by said selective operation of said first register.

17. In an automatic telephone system, a party line, a plurality of stations on said party line, a calling device at each of said stations, the calling device at any calling one of said stations being selectively operable to transmit over said party line during a single operation thereof both a variable series of impulses and an individual station identifying signal, whereby the calling devices at said stations transmit over said party line different station identifying signals incident to operation thereof, switching apparatus, a line relay controlled in response to the transmission over said party line of one or more variable series of impulses for controlling said switching apparatus to extend the call from the calling one of said stations, a party relay controlled in response to the transmission over said party line of the station identifying signal individual to the calling device at said one calling station, a plurality of station registers individually corresponding to said stations, a first register, a first control conductor for said first register, a second register, a second control conductor for said second register, contact means operated by said party relay for selectively operating said first register over a circuit including said first control conductor, contact means operated by said line relay for selectively operating said second register over a circuit including said second control conductor, and contact means controlled by said selective operation of said first register and said second register for operating the particular one of said station registers corresponding to said one calling station.

18. In an automatic telephone system, a party line, a plurality of stations on said party line, a calling device at each of said stations, the calling device at any calling one of said stations being selectively operable to transmit over said party line during a single operation thereof both a variable series of impulses and an individual station identifying signal, whereby the calling devices at said stations transmit over said party line different station identifying signals incident to operation thereof, switching apparatus, a line relay controlled in response to the transmission over said party line of one or more variable series of impulses for controlling said switching apparatus to extend the call from the calling one of said stations, a party relay controlled in response to the transmission over said party line of the station identifying signal individual to the calling device at said one calling station, a plurality of station registers individually corresponding to said stations, a first group of register relays, a first control conductor for said first group of register relays, a second group of register relays, a second control conductor for said second group of register relays, contacts controlled by said party relays in response to said control thereof for selectively operating certain of said relays in said first group of relays over a circuit including said first control conductor, contacts controlled by said line relay in response to said control thereof for at times selectively operating certain of said relays in said second group of register relays over a circuit including said second control conductor, and contact means controlled by the operated and non-operated condition of said certain relays in said first group of register relays or by the operated and non-operated condition of certain of said relays in said first group of register relays and said second group of register relays for selectively operating the particular one of said station registers corresponding to said one calling station.

References Cited in the file of this patent

UNITED STATES PATENTS

| | | |
|---|---|---|
| 2,410,520 | Ostline | Nov. 5, 1946 |
| 2,508,026 | Hersey | May 16, 1950 |
| 2,535,509 | Ostline | Dec. 26, 1950 |
| 2,550,585 | Murphy | Apr. 24, 1951 |
| 2,603,173 | Ostline | July 15, 1952 |